UNITED STATES PATENT OFFICE.

ERNST KÖNIG, OF HÖCHST-ON-THE-MAIN, GERMANY, ASSIGNOR TO THE FARBWERKE, VORMALS MEISTER, LUCIUS & BRÜNING, OF SAME PLACE.

BASIC DISAZO DYE.

SPECIFICATION forming part of Reissued Letters Patent No. 11,714, dated January 31, 1899.

Original No. 602,641, dated April 19, 1898. Application for reissue filed January 3, 1899. Serial No. 701,071.

*To all whom it may concern:*

Be it known that I, ERNST KÖNIG, doctor of philosophy, a citizen of the Empire of Germany, residing at Höchst-on-the-Main, Germany, have invented certain new and useful Improvements in the Manufacture of Disazo and Polyazo Dyestuffs, of which the following is a specification.

This invention relates to the production of disazo and polyazo dyestuffs.

I have found that aromatic amido-ammonium bases of the general formula $$(\text{Aromatic radical})\begin{cases}NH_2\\ NR_3x\end{cases}$$

may be employed for the manufacture of valuable disazo and polyazo dyestuffs of the general formula $$\left(\begin{matrix}\text{Aromatic}\\ \text{radical}\end{matrix}\right)\begin{cases}N(CH_3)_3x\\ N{=}N\end{cases}(1)\ \text{alphyl}\ (4)\begin{cases}N{=}N\\ \begin{matrix}\text{phenol}\\ \text{alphylamin}\\ \text{oxy or amido azo}\\ \text{dyestuff.}\end{matrix}\end{cases}$$

In the foregoing formula R stands for $CH_3$. $x$ means chlorin or the equivalent radical of an acid, alphylamin an aromatic amin, and alphyl an aromatic radical in such an amin.

The process consists in diazotizing the amido-ammonium azo dyestuffs obtained from diazotized aromatic amido-ammonium bases and primary amins—such as alpha-naphthylamin, 1.2 amido-naphthol ether, meta-amido-para-cresol-ethyl or methyl ether, meta and ortho anisidin, meta and ortho phenetidin, metatoluidin, paraxylidin—and combining them with phenols or alphylamins, oxy or amido azo dyestuffs.

The basic disazo dyestuffs manufactured according to the following example have the property of dyeing wool and cotton simultaneously in an acid-bath.

Example: 37.7 kilos of the hydrochlorid of the amidoazo compound, made from meta-amidophenyltrimethyl ammonium chlorid and alpha-naphthylamin, are dissolved in about nine hundred liters of water and diazotized by the addition of twenty kilos of hydrochloric acid and 6.9 kilos of nitrite of sodium. The diazo solution thus obtained is run into an aqueous solution of twenty-five kilos of chrysoidin in about five hundred liters of water, to which are added thirty kilos of acetate of sodium. When the reaction is completed, the whole is brought to solution by heating and the dyestuff separated with common salt.

The dyestuff thus obtained has the following properties: It forms a blackish-brown powder easily soluble in cold water with a brown color. Neither soda nor soda-lye nor hydrochloric acid changes the color of the solution. It is soluble in concentrated sulfuric acid with an olive-green color, insoluble in benzene, petroleum ether, and ether, but soluble in alcohol.

The new dyestuff dyes tanned and untanned cotton, as well as half-wool, in an even brown color in a bath acidified with sulfuric acid.

Having thus described my invention, what I claim is—

1. The process of producing disazo and polyazo dyestuffs, which consists in diazotizing the amidoazo dyestuffs from diazotized aromatic amido-ammonium bases and primary alphylamins, and then combining them with phenols, alphylamins, oxy or amido azo dyestuffs, substantially as set forth.

2. As a new product, the brown dyestuff obtained from diazotized meta-trimethyl ammonium phenyl-azo-alphanaphthylamin and chrysoidin, being a blackish-brown powder, easily soluble in water with a brown color, which solution is not changed either by alkalies or acids, dissolved by concentrated sulfuric acid with an olive-green color; insoluble in ether and benzene or petroleum ether, but soluble in alcohol, and dyeing tanned and untanned cotton, as well as half-wool, brown in an acid-bath, substantially as set forth.

In testimony that I claim the foregoing as my invention I have signed my name in presence of two subscribing witnesses.

ERNST KÖNIG

Witnesses:
ALFRED BRISBOIS,
WILHELM SCHAAB.